United States Patent
Ji et al.

(10) Patent No.: US 10,620,978 B2
(45) Date of Patent: Apr. 14, 2020

(54) SIMULATION DESKTOP ESTABLISHMENT METHOD AND RELATED APPARATUS

(71) Applicant: Huawei Technologies Co., Ltd., Shenzhen (CN)

(72) Inventors: Hao Ji, Nanjing (CN); Jianqi Guo, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 719 days.

(21) Appl. No.: 15/343,643

(22) Filed: Nov. 4, 2016

(65) Prior Publication Data
US 2017/0075707 A1 Mar. 16, 2017

Related U.S. Application Data

(63) Continuation of application No. PCT/CN2014/076801, filed on May 5, 2014.

(51) Int. Cl.
*G06F 17/50* (2006.01)
*G06F 9/455* (2018.01)
(Continued)

(52) U.S. Cl.
CPC ............ *G06F 9/455* (2013.01); *G06F 3/0481* (2013.01); *G06F 3/04883* (2013.01);
(Continued)

(58) Field of Classification Search
CPC .... G06F 9/455; G06F 3/0481; G06F 3/04883; G06F 9/453; G06F 9/451; G06F 9/4451
(Continued)

(56) References Cited

U.S. PATENT DOCUMENTS

| 5,832,505 A | * | 11/1998 | Kasso | G06F 9/44505 |
| 2001/0019338 A1 | * | 9/2001 | Roth | G06F 3/0482 715/811 |

(Continued)

FOREIGN PATENT DOCUMENTS

| CN | 1790339 A | 6/2006 |
| CN | 101421984 A | 4/2009 |

(Continued)

OTHER PUBLICATIONS

Machine Translation and Abstract of Chinese Publication No. CN1790339, Jun. 21, 2006, 13 pages.
(Continued)

*Primary Examiner* — Dwin M Craig
(74) *Attorney, Agent, or Firm* — Conley Rose, P.C.

(57) ABSTRACT

A simulation desktop establishment method includes: acquiring, by a terminal, system parameter of a current operating system; and establishing, by the terminal, a simulation desktop by using preset configuration data according to the system parameter, where content of simulation desktop parameters of the established simulation desktop is the same as content of the system parameter. It can be seen that, required system parameter are directly acquired from an operating system, and a simulation desktop corresponding to the operating system is established by using preset configuration data according to the system parameter, so that the established simulation desktop is basically the same as the operating system in appearance, interface, and the like, which can give a user a strong sense of identification.

20 Claims, 10 Drawing Sheets

(51) Int. Cl.
- *G06F 9/451* (2018.01)
- *G06F 9/445* (2018.01)
- *G06F 3/0481* (2013.01)
- *G06F 3/0488* (2013.01)

(52) U.S. Cl.
CPC ............ *G06F 9/4451* (2013.01); *G06F 9/451* (2018.02); *G06F 9/453* (2018.02)

(58) Field of Classification Search
USPC .......................................................... 703/27
See application file for complete search history.

(56) References Cited

U.S. PATENT DOCUMENTS

| | | | |
|---|---|---|---|
| 2002/0169591 A1* | 11/2002 | Ryzl | G06F 8/20 703/24 |
| 2006/0053372 A1 | 3/2006 | Adkins et al. | |
| 2008/0020750 A1* | 1/2008 | Ko | H04B 17/0087 455/423 |
| 2008/0163201 A1 | 7/2008 | Fabrice et al. | |
| 2009/0178011 A1 | 7/2009 | Ording et al. | |
| 2009/0179867 A1 | 7/2009 | Shim et al. | |
| 2011/0008758 A1* | 1/2011 | Kortas | G09B 7/02 434/219 |
| 2011/0271185 A1 | 11/2011 | Chen et al. | |

FOREIGN PATENT DOCUMENTS

| | | |
|---|---|---|
| CN | 101587456 A | 11/2009 |
| CN | 101916215 A | 12/2010 |
| CN | 102197374 A | 9/2011 |
| CN | 102339321 A | 2/2012 |
| CN | 102364423 A | 2/2012 |
| CN | 102591700 A | 7/2012 |
| CN | 102662741 A | 9/2012 |
| CN | 103369029 A | 10/2013 |

OTHER PUBLICATIONS

Machine Translation and Abstract of Chinese Publication No. CN102364423, Feb. 29, 2012, 14 pages.
Machine Translation and Abstract of Chinese Publication No. CN101587456, Nov. 25, 2009, 8 pages.
Machine Translation and Abstract of Chinese Publication No. CN101916215, Feb. 1, 2012, 7 pages.
Machine Translation and Abstract of Chinese Publication No. CN102339321, Feb. 1, 2012, 12 pages.
"Android: How can i implement first time tutorial like Go Launcher in my app?—Stack Overflow" Nov. 1, 2012, 3 pages.
Foreign Communication From a Counterpart Application, European Application No. 14891492.2, Extended European Search Report dated Mar. 21, 2017, 10 pages.
Foreign Communication From a Counterpart Application, Chinese Application No. 201480001542.9, Chinese Office Action dated May 12, 2017, 9 pages.
Foreign Communication From a Counterpart Application, Chinese Application No. 201480001542.9, Chinese Office Action dated Nov. 14, 2016, 9 pages.
Foreign Communication From a Counterpart Application, PCT Application No. PCT/CN2014/076801, English Translation of International Search Report dated Feb. 9, 2015, 2 pages.
Foreign Communication From a Counterpart Application, PCT Application No. PCT/CN2014/076801, English Translation of Written Opinion dated Feb. 9, 2015, 14 pages.
Machine Translation and Abstract of Chinese Publication No. CN103369029, Oct. 23, 2013, 15 pages.
Foreign Communication From a Counterpart Application, Chinese Application No. 201480001542.9, Chinese Office Action dated Oct. 20, 2017, 8 pages.

* cited by examiner

SIMULATION DESKTOP ESTABLISHMENT METHOD AND RELATED APPARATUS

CROSS-REFERENCE TO RELATED APPLICATIONS

This application is a continuation of international patent application number PCT/CN2014/076801 filed on May 5, 2014, which is incorporated by reference.

TECHNICAL FIELD

The present disclosure relates to the field of computers, and in particular, to a simulation desktop establishment method and a related apparatus.

BACKGROUND

Currently, intelligent terminals develop rapidly, and operating systems of the intelligent terminals are also rapidly upgraded, and version numbers of the operating systems are increased. With the version numbers increased, new functions and many changes in system settings are brought to the operating systems. In addition, new applications for operating systems are also springing up. It is very hard for new and old users, without trying, to learn and correctly use practical effects of an unfamiliar function and an unfamiliar application in an operating system. However, users generally have a resistant feeling, and do not dare to rashly try an unfamiliar function and application, and especially, aspects related to a system setting, because the users are afraid that a setting change or mis-operation affects or changes an operating system, which cannot be resolved by the users. How to enable users to try all unfamiliar functions and all functions of an unfamiliar application in an operating system of an intelligent terminal without worries on the basis of not affecting the operating system is a problem urgently needing to be resolved.

Currently, a method of a simulation desktop is mainly used to resolve the requirement. A desktop of an operating system, some functions of the operating system such as a short message service message and a phone book, and interfaces of application scenarios related to applications of the functions are stored in a simulation desktop. When the simulation desktop is entered, a user taps a specified area according to a tap prompt of the simulation desktop; and the simulation desktop presents, to the user according to a tap operation of the user, an interface of an application scenario that may appear and a related description when the tap operation is performed, so that the user can be familiar with an unfamiliar function without making any change to the operating system.

A problem lies in that, various interfaces, which are presented by the simulation desktop, of the operating system are all made and designed in advance, an order and locations of all operation processes, that is, tap and slide, are preset, and content is basically fixed, but personalized settings of operating systems of users are basically different. For the simulation desktop having fixed content, it is very hard for a user to make the simulation desktop correspond to the operating system, and consequently, a function tried in the simulation desktop cannot be rapidly applied to the operating system. As a result, such a simulation desktop of low simulation cannot effectively achieve an effect of helping a user to be familiar with an unfamiliar function in an operating system.

SUMMARY

A technical problem that the present disclosure resolves is to provide a simulation desktop establishment method and a related apparatus, so as to establish a simulation desktop by using system parameter of an operating system, thereby improving a similarity between the simulation desktop and the operating system.

To resolve the foregoing technical problem, the technical solutions used in the present disclosure are as follows:

According to a first aspect, the present disclosure provides a simulation desktop establishment method, where the method includes: acquiring, by a terminal, system parameter of a current operating system; and establishing, by the terminal, a simulation desktop by using preset configuration data according to the system parameter, where content of simulation desktop parameter of the established simulation desktop is the same as content of the system parameter.

In a first possible implementation manner of the first aspect, the system parameter include a setting parameter used to describe a setting of the operating system, a system desktop parameter used to describe a desktop of the operating system, and an application parameter used to describe an installed application in the operating system; and the establishing, by the terminal, a simulation desktop by using preset configuration data according to the system parameter includes: acquiring, by the terminal, a desktop quantity and a desktop background of the operating system, an application name, location coordinates, and a size of an occupied desktop of an application on each desktop of the operating system, and current setting content of the operating system according to the setting parameter, the system desktop parameter, and the application parameter; and establishing, by the terminal, the simulation desktop by using the configuration data according to the desktop quantity and the desktop background of the operating system, the application name, the location coordinates, and the size of the occupied desktop of the application on each desktop of the operating system, and the current setting content of the operating system.

With reference to the first aspect or the first possible implementation manner of the first aspect, in a second possible implementation manner, the establishing, by the terminal, a simulation desktop by using preset configuration data according to the system parameter includes: converting, by the terminal according to the configuration data, data structures of the system parameter into data structures used to establish the simulation desktop; and establishing, by the terminal, the simulation desktop according to the system parameter whose data structures are converted.

With reference to the first aspect or the first or the second possible implementation manner of the first aspect, in a third possible implementation manner, the method further includes: acquiring, by the terminal, interaction information that corresponds to a system function and the installed application and that is included in the system parameter, where the interaction information includes a function description of the corresponding system function or application.

With reference to the first aspect or the first, the second, or the third possible implementation manner of the first aspect, in a fourth possible implementation manner, the method further includes: opening the simulation desktop; monitoring, by the simulation desktop, an operation type and an operation location of an operation that is performed by a user on the simulation desktop, where the operation type includes tap or slide; and determining, by the simulation desktop, the operation type and the operation location of the operation, and performing a corresponding interaction action according to a determining result of the determining, where the interaction action includes presenting a corresponding interface and/or presenting corresponding interaction information.

With reference to the fourth possible implementation manner of the first aspect, in a fifth possible implementation manner, the method further includes: when the simulation desktop parameter are changed, sequentially recording, by the simulation desktop, changed simulation desktop parameter; and when receiving a return operation signal, replacing, by the simulation desktop, a current simulation desktop parameter with the changed simulation desktop parameter recorded last time before current recording.

With reference to the fifth possible implementation manner of the first aspect, in a sixth possible implementation manner, the method further includes: when receiving an execution operation signal, determining, by the simulation desktop, a difference between the changed simulation desktop parameter recorded last time and the simulation desktop parameter when the simulation desktop is established; and invoking, by the simulation desktop, a corresponding system interface, and applying the difference to the operating system.

According to a second aspect, the present disclosure provides a simulation desktop establishment apparatus, where the apparatus includes: a system parameter acquiring unit configured to acquire system parameter of a current operating system; and a simulation desktop establishment unit configured to establish a simulation desktop by using preset configuration data according to the system parameter, where content of simulation desktop parameter of the established simulation desktop is the same as content of the system parameter.

In a first possible implementation manner of the second aspect, the system parameter include a setting parameter used to describe a setting of the operating system, a system desktop parameter used to describe a desktop of the operating system, and an application parameter used to describe an installed application in the operating system; and the simulation desktop establishment unit is configured to: acquire a desktop quantity and a desktop background of the operating system, an application name, location coordinates, and a size of an occupied desktop of an application on each desktop of the operating system, and current setting content of the operating system according to the setting parameter, the system desktop parameter, and the application parameter; and establish the simulation desktop by using the configuration data according to the desktop quantity and the desktop background of the operating system, the application name, the location coordinates, and the size of the occupied desktop of the application on each desktop of the operating system, and the current setting content of the operating system.

With reference to the second aspect or the first possible implementation manner of the second aspect, in a second possible implementation manner, the simulation desktop establishment unit further includes a conversion subunit and an establishment subunit, where the conversion subunit converts, according to the configuration data, data structures of the system parameter into data structures used to establish the simulation desktop; and the establishment subunit establishes the simulation desktop according to the system parameter whose data structures are converted.

With reference to the second aspect or the first or the second possible implementation manner of the second aspect, in a third possible implementation manner, the apparatus further includes: an interaction information acquiring unit configured to acquire interaction information that corresponds to a system function and the installed application and that is included in the system parameter, where the interaction information includes a function description of the corresponding system function or application.

With reference to the second aspect or the first, the second, or the third possible implementation manner of the second aspect, in a fourth possible implementation manner, the apparatus further includes: an opening unit configured to open the simulation desktop; an operation monitoring unit configured to monitor an operation type and an operation location of an operation that is performed by a user on the simulation desktop, where the operation type includes tap or slide; and an operation determining unit configured to determine the operation type and the operation location of the operation, and perform a corresponding interaction action according to a determining result of the determining, where the interaction action includes presenting a corresponding interface and/or presenting corresponding interaction information.

With reference to the fourth possible implementation manner of the second aspect, in a fifth possible implementation manner, the apparatus further includes: a parameter recording unit configured to: when the simulation desktop parameter are changed, sequentially record changed simulation desktop parameter; and a parameter replacement unit configured to: when receiving a return operation signal, replace a current simulation desktop parameter with the changed simulation desktop parameter recorded last time before current recording.

With reference to the fifth possible implementation manner of the second aspect, in a sixth possible implementation manner, the apparatus further includes: a parameter determining unit configured to: when receiving an execution operation signal, determine a difference between the changed simulation desktop parameter recorded last time and the simulation desktop parameter when the simulation desktop is established; and a parameter application unit configured to invoke a corresponding system interface, and apply the difference to the operating system.

According to a third aspect, the present disclosure provides a terminal, including a memory, a receiver, and a processor separately connected to the memory and the receiver, where the memory is configured to store a program, where the program is specifically: acquiring system parameter of a current operating system; and establishing a simulation desktop by using preset configuration data according to the system parameter, where content of simulation desktop parameter of the established simulation desktop is the same as content of the system parameter; the processor is configured to read and perform the program stored in the memory, which is specifically: acquiring system parameter of a current operating system; and establishing a simulation desktop by using preset configuration data according to the system parameter, where content of simulation desktop parameter of the established simulation desktop is the same as content of the system parameter; and the receiver is configured to acquire the system parameter of the current operating system.

It can be seen from the foregoing technical solutions that, required system parameter are directly acquired from an operating system, and a simulation desktop corresponding to the operating system is established by using preset configuration data according to the system parameter, so that the established simulation desktop is basically the same as the operating system in appearance, interface, and the like, which can give a user a strong sense of identification. A function tried on such a simulation desktop can be rapidly and directly located and applied to a corresponding operating system, thereby achieving an effect of effectively helping a user to be familiar with an unfamiliar function in the operating system and improving user experience.

DESCRIPTION OF EMBODIMENTS

Figure 1:
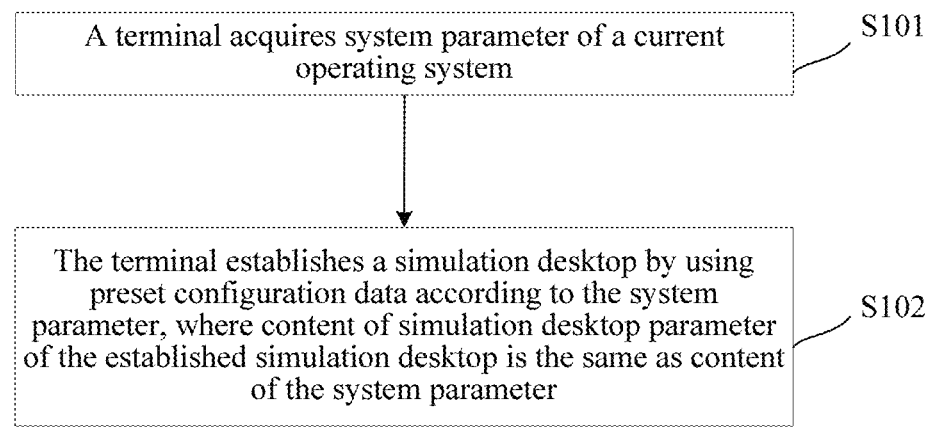
FIG. 1 is a method flowchart 1 of a simulation desktop establishment method according to the present disclosure.

Embodiments of the present disclosure provide a simulation desktop establishment method and a related apparatus. For a simulation desktop in some approaches, application interfaces, which are made in advance, of some basic system functions in an operating system are mainly used, and interface pictures are associated according to a predetermined tap process. However, for intelligent terminals of different users, personalized settings such as preference settings of systems, desktop backgrounds, desktop applications, and placed locations of function icons of the intelligent terminals are basically different. If some functions that are unfamiliar to a user are tried by using the simulation desktop that is established by using the foregoing pictures that are made in advance, it is very hard for the user to establish a correspondence between the simulation desktop and a desktop of the operating system. Even if operations are performed in the unfamiliar simulation desktop one by one, after an operating system that is totally different from the just operated simulation desktop is returned to, basically, it is very hard to find a location corresponding to a just tried function or apply a just performed operation to the operating system, and it is possible that the corresponding location or an operation corresponding to an application are found very hard in the operating system after switching and comparison are performed on the simulation desktop and the operating system multiple times. As a result, such a simulation desktop of low simulation cannot achieve an effect of helping a user to be familiar with an unfamiliar function in an operating system. In the present disclosure, required system parameter are directly acquired from an operating system, and a simulation desktop corresponding to the operating system is established by using preset configuration data according to the system parameter, so that the established simulation desktop is basically the same as the operating system in appearance, interface, and the like, which can give a user a strong sense of identification. A function tried on such a simulation desktop can be rapidly and directly located and applied to a corresponding operating system, thereby achieving an effect of effectively helping a user to be familiar with an unfamiliar function in the operating system and improving user experience.

In addition, an operation process of the simulation desktop in some approaches is fixed. A user can only perform operations one by one according to steps preset in the simulation desktop, which is very inflexible. For example, in an interface of a function A, the user can and can only perform a tap or slide operation in a specified area to enter a next interface, and for any operation by the user performed at another location except the specified area in the interface of the function A, a simulation system provides no feedback. Alternatively, if a function B that the user wants to learn occurs in a preset step 10, regardless of whether the user is interested in or needs to learn the first ten steps, the user needs to perform tap operations one by one until step 10 before learning the B function. Such a design is not humanized. Therefore, according to the simulation desktop provided in the embodiments of the present disclosure, the concept of a specified area is not set, and a fixed operation order or an experience process is not preset either. An operation performed by a user on an interface of a presented simulation desktop is monitored, a feedback on the operation is basically the same as that when the user operates the operating system, and the user may perform a tap/slide operation and try in the interface according to a requirement of the user, and may directly learn a function that the user needs to learn, thereby further improving practicality of a simulation system.

To make a person skilled in the art better understand the solutions of the embodiments of the present disclosure, the following further describes the embodiments of the present disclosure in detail with reference to the accompanying drawings and implementation manners.

Embodiment 1

This embodiment describes how to establish a simulation desktop that can correspond to an operating system and has a high similarity. As shown in FIG. 1, FIG. 1 is a method flowchart 1 of a simulation desktop establishment method according to the present disclosure. The shown method includes the following steps:

S101: A terminal acquires system parameter of a current operating system.

That is, for intelligent terminals of different users, by means of the present disclosure, the terminals all acquire system parameters of a current operating system with allowed permission by accessing a corresponding system interface. The operating system described herein refers to an operating system currently running in the intelligent terminal, for example, an Android system, or an iOS system. The system parameter mainly includes a parameter of an installed application, a system setting parameter, and a parameter of a user interface (UI) of a system. The acquired system parameters are used as a parameter basis of establishing a simulation desktop. For example, a system desktop parameter in the system parameter is used as a system desktop parameter of the simulation desktop, and a setting parameter, which is related to a system setting, in the system parameter is used as a system setting parameter of a system setting of the simulation desktop, and therefore, the generated simulation desktop may have an effect basically similar to that of the current operating system.

The terminal may be one or more hardware chips or processors.

Subsequently, how to acquire system parameters is described by using an example. For example, for a Huawei intelligent terminal in which an Android system is installed, first, an interface module is invoked with allowed permission by using a simulation desktop establishment file, system parameters of the Android system are acquired from a system interface, and parameters such as a name, a packet name, a class name, a located screen (screen), a horizontal coordinate (cellX), a longitudinal coordinate (cellY), a size (spanX, spanY) of an occupied unit, a desktop wallpaper, and a notification bar of an application installed in the intelligent terminal may be acquired from the intelligent terminal by reading data in content://com.huawei.android.launcher.settings/favorites of a launcher.

For composition of the system parameters, the technical solution of the present disclosure provides a preferred combination manner. The system parameter include a setting parameter used to describe a setting of the operating system, a system desktop parameter used to describe a desktop of the operating system, and an application parameter used to describe an installed application in the operating system. Based on the composition manner, in step S102, there is also a corresponding process of generating the simulation desktop, and a specific process is described in S102 in detail. In addition, it should be noted that, specific composition of the system parameters is not limited in the present disclosure.

For a coding mode of preset configuration data, the Extensible Markup Language (XML) is preferably used for compiling, or another computer language may be used for compiling, which is not limited in the present disclosure. For ease of description, in this embodiment, examples of encoding of related configuration data are all based on the xml.

S102: The terminal establishes a simulation desktop by using preset configuration data according to the system parameter, where content of simulation desktop parameter of the established simulation desktop is the same as content of the system parameter.

Herein, it should be noted that, the configuration data has a user-defined function, that is, the configuration data may be user-defined in a particular function range. The user-defined function mainly includes setting an interaction manner, an interaction type, an interaction action between the simulation desktop and a user, which may all be defined by the user in advance, so that a finally generated simulation desktop more meets a preference of the user, and is more humanized. For a code structure of the configuration data, refer to the following example:

```
<!--interaction mode-->
<!--interaction mode type, eg: a bubble prompt pops up, and a toast prompt pops up-->
<!--interaction action, eg: tap and slide-->
<!--during interaction, display a form of prompt content, eg: a picture, a text, or a voice-->
    <InteractMode>
        <type>paopao</type>
        <action>click</action>
        <content>picture</content>
    </InteractMode>
<!--system application -->
    <Elements>
<!--single application -->
<!--an application id, an application name, an application icon, a brief description of
an application, a detailed description of an address of the application, a packet name
and a class name of the application-->
    <Element>
        <eid>1</eid>
        <name>telephone</name>
        <iconSrc>dialtactsactivity</iconSrc>
        <info>make a call, check call records, and set attributes of a voice mailbox, an
        IP telephone, and an Internet call</info>
        <url>product_content/call/topic_phone_call.html</url>
        <packetName>com.android.contacts</packetName>
        <className>com.android.contacts.activities.DialtactsActivity</className>
    </Element>
    <Element>
        <eid>2</eid>
        <name>information</name>
        <iconSrc>message</iconSrc>
        <info>send and receive a short message service message and a multimedia
        message, and a free network message may be sent by registering with
        TTchat</info>
        <url>product_content/message/topic_exchange_message.html</url>
        <packetName>com.huawei.message</packetName>
        <className>com.hotalk.ui.homepage.messagegroup.HWMessageGroup
        Activity</className>
    </Element>
```

A part about interaction between the simulation desktop and the user belongs to a range of how to use a simulation desktop, which is described in detail in Embodiment 2.

Figure 2A:
FIG. 2A is a schematic diagram of a desktop of an operating system of an intelligent terminal.
Figure 2B:
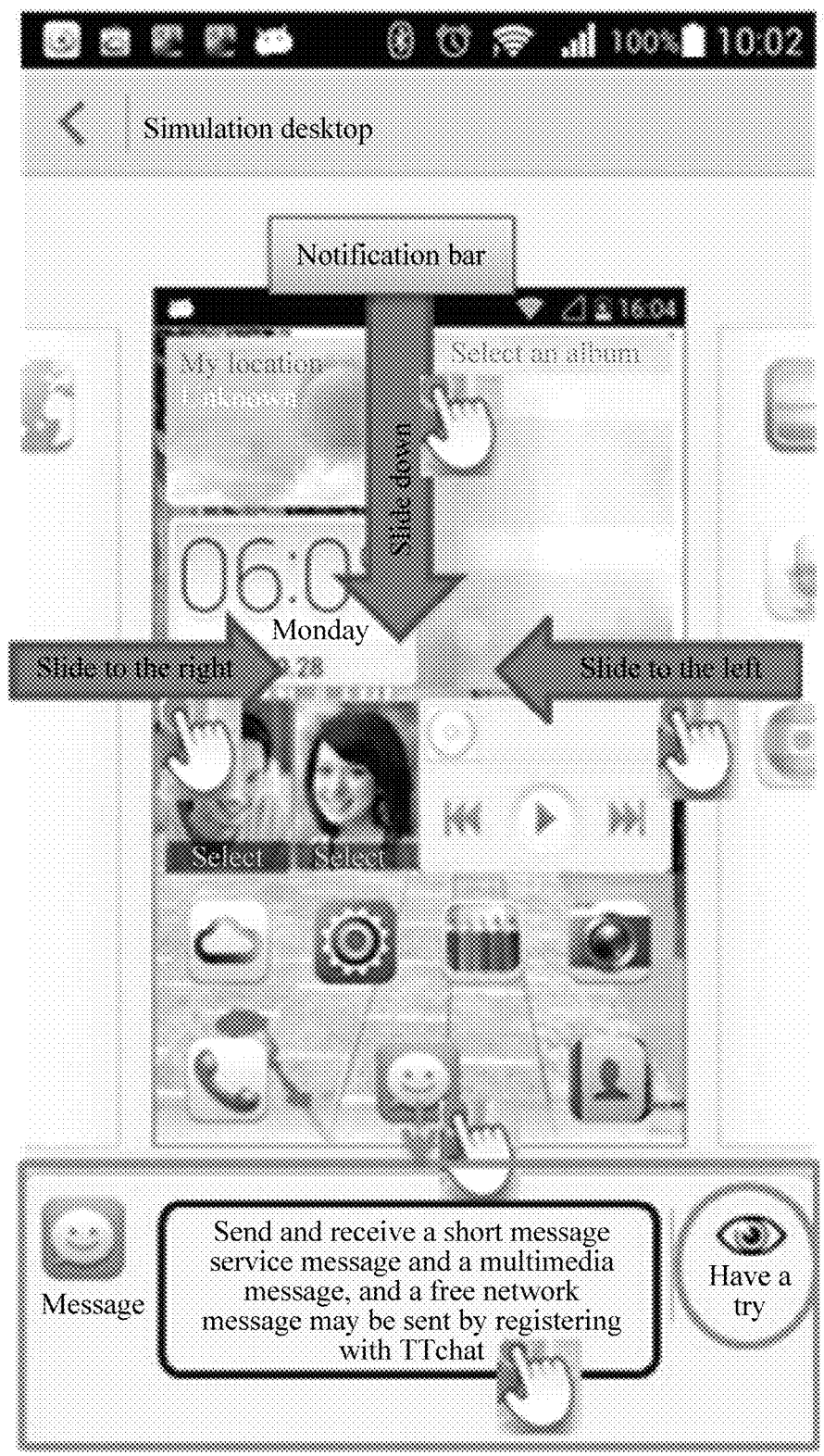
FIG. 2B is a schematic diagram of a simulation desktop corresponding to the operating system shown in FIG. 2A according to the present disclosure.

In an actual operation, the terminal uses the system parameters as input data of the preset configuration data, that is, uses the system parameters as a data basis of establishing the simulation desktop, and the simulation desktop that can correspond to the operating system is rapidly generated. As shown in FIG. 2a and FIG. 2b, FIG. 2a presents a desktop of an operating system of an intelligent terminal, and FIG. 2b presents a simulation desktop corresponding to the operating system shown in FIG. 2a. It can be seen that, the simulation desktop displayed in FIG. 2b is basically the same as the operating system in 2a in appearance, and moreover, feedbacks on an operation of a user are also basically the same, for example, feedbacks on tap on an application icon by the user, and up/down slide and left/right slide on a system desktop in the simulation desktop are all the same as feedbacks on same operations performed in the operating system. A feedback on an operation of a user is specifically described in Embodiment 2.

When the system parameter in step S101 preferably specifically include the setting parameter used to describe the setting of the operating system, the system desktop parameter used to describe the desktop of the operating system, and the application parameter used to describe the installed application in the operating system, in the present disclosure, there is a corresponding simulation desktop generation process according to such specific composition of the system parameters.

The establishing, by the terminal, a simulation desktop by using preset configuration data according to the system parameter in step S102 includes: acquiring, by the terminal, a desktop quantity and a desktop background of the operating system, an application name, location coordinates, and a size of an occupied desktop of an application on each desktop of the operating system, and current setting content of the operating system according to the setting parameter, the system desktop parameter, and the application parameter, and establishing the simulation desktop by using the configuration data according to the foregoing parameters.

A manner of acquiring, by the terminal, the desktop quantity and the desktop background of the operating system, the application name, the location coordinates, and the size of the occupied desktop of the application on each desktop of the operating system, and the current setting content of the operating system is not limited in the present disclosure, which may be acquired preferably in the following manner: the terminal obtains the desktop quantity and the desktop background of the operating system according to the system desktop parameter; the terminal obtains the application name, the location coordinates, and the size of the occupied desktop of the application on each desktop of the operating system according to the system desktop parameter and the application parameter; the terminal obtains the current setting content of the operating system according to the setting parameter; and the terminal according to the desktop quantity and the desktop background of the operating system, the application name, the location coordinates, and the size of the occupied desktop of the application on each desktop of the operating system, and the current setting content of the operating system; the terminal establishes the simulation desktop by using the configuration data according to the desktop quantity and the desktop background of the operating system, the application name, the location coordinates, and the size of the occupied desktop of the application on each desktop of the operating system, and the current setting content of the operating system.

That is, the simulation desktop is established totally according to system parameters of the current operating system of the intelligent terminal, and has a same setting parameter, system desktop parameter, and application parameter as the operating system. Specifically, the desktop quantity and the desktop background of the simulation desktop are both the same as those of the operating system, the application name, the location coordinates, and the size of the occupied desktop of each application on the desktop of the simulation desktop are all the same as those of the operating system, and the current setting content of the simulation desktop is the same as that of the operating system.

After acquiring the system parameters, the terminal performs corresponding encoding processing and data format conversion on the system parameters according to a data structure requirement of the configuration data, that is, the terminal converts, according to the configuration data, data structures of the system parameters into data structures used to establish the simulation desktop; and the terminal establishes the simulation desktop according to the system parameters whose data structures are converted.

Data structures of some system parameters are converted as follows: A data structure of each installed application (which includes necessary information such as a name, an image, a location, and an icon size of the application) is:

```
//current screen id
private int mID;
//horizontal coordinate
private int mCellX;
//longitudinal coordinate
private int mCellY;
//a quantity of occupied space units in a horizontal direction
private int mSpanX;
//a quantity of occupied space units in a longitudinal direction
private int xSpanY;
//application icon
private String mIconName;
//application name
private String mAppName;
//a brief description of an application
private String mAppInfo;
//corresponding information url
private String mUrl;
//packet name and class name
private String mPackageName;
private String mClassName;
a data structure of a single screen is:
public class Screen {
    //including multiple application icons
    private List<Element> elements= new ArrayList<Element>( );
    //current screen id
    private int mSrceenID; and
data structures of multiple screens are:
public class EmuiIntroduce {
/**
*including multiple screens
    */
private List<Screen> mScreens = new ArrayList<Screen>( );
    /**
    *a quantity of icons in each row
    */
        private int rowElementNumbers;
```

In addition to needing to acquire the system parameters to perform data structure conversion to establish the simulation desktop, the terminal may further acquire, according to functions and applications in the acquired system parameters, interaction information corresponding to these functions and applications, where the interaction information mainly includes brief descriptions, related interfaces, descriptions of features of the corresponding functions or applications. A time of acquiring the interaction information may be a time before the simulation desktop is generated, or may be a time after the simulation desktop is generated, which is not limited in the present disclosure. Based on FIG. 1, referring to FIG. 3, the method may further include:

S301: A terminal acquires system parameters of the operating system.

S302: The terminal establishes a simulation desktop by using preset configuration data according to the system parameters, where content of simulation desktop parameters of the established simulation desktop is the same as content of the system parameters.

S303: The terminal acquires interaction information that corresponds to a system function and an installed application and that is included in the system parameters, where the interaction information includes a function description of the corresponding system function or application.

Figure 3:
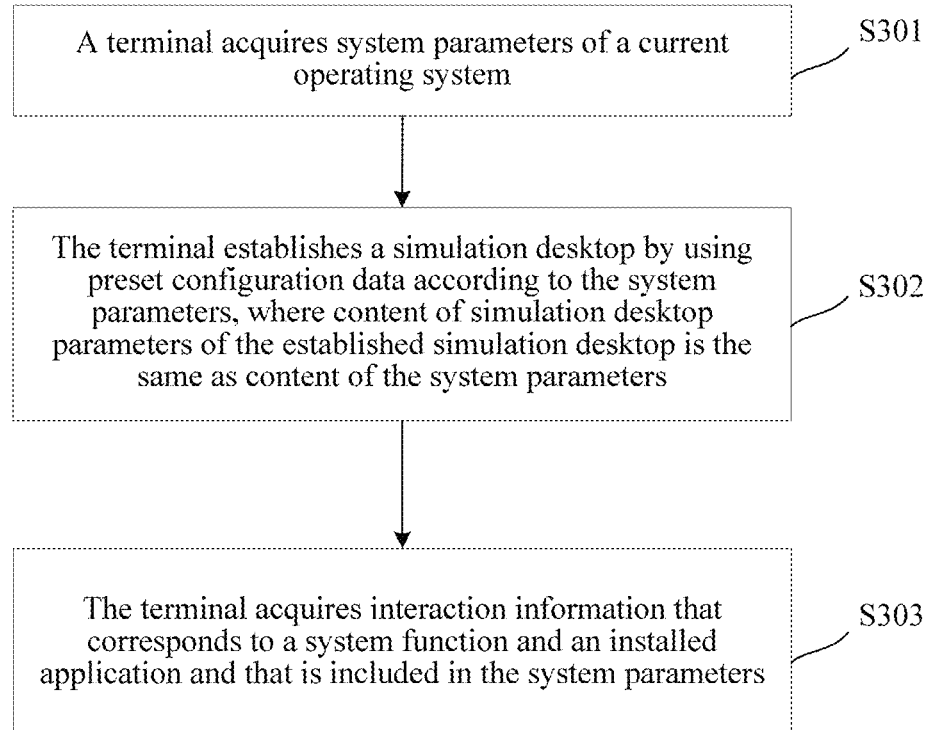
FIG. 3 is a method flowchart 2 of a simulation desktop establishment method according to the present disclosure.

It should be noted that, FIG. 3 shows an order in which S303 is performed after S302 is performed, but step S303 is not necessarily performed after step S302 is performed, and actually, step S303 only needs to be performed after S301, that is, after the terminal acquires the system parameters, that is, reflected in an actual operation of the simulation desktop, the interaction information may be acquired in a process of establishing the simulation desktop, or may be automatically or manually updated after the simulation desktop is established.

Herein, all of the acquired interaction information may be stored locally, or only a url address or another form corresponding to the interaction information may be stored. When a user triggers a function or an application that corresponds to the interaction information, content of the interaction information is retrieved and presented on the simulation desktop (if only the url address of the interaction information is stored, when the content of the interaction information needs to be presented, the url address is accessed, and content of a page at the url address is presented). Presentation may be performed by using a bubble, a pop-up window, or in another form. The content of the interaction information may be presented by using a text, a voice, a picture, or in another form. All these presentation forms and content presentation forms may be defined by the user according to a preference of the user, which is not limited in the present disclosure.

In the intelligent terminal, the simulation desktop established in this embodiment of the present disclosure may include functions and applications, which are installed in the current operating system, of the intelligent terminal. That is, an unfamiliar function or application, which the user wants to learn, of the intelligent terminal certainly exists in the established simulation desktop. The user may directly tap or find the function or the application, which the user wants to learn, on the simulation desktop, and correspondingly try or be familiar with the function by using interaction information that corresponds to the function or the application and that is presented on the simulation desktop. After the operating system is returned to, because the simulation desktop and the operating system has a high similarity, the user may find right away a location of the function or the application that is just operated, thereby achieving an effect of rapidly learning the operating system. Such an intuitive and rapid manner is incompatible to some approaches in which a simulation desktop is established by using pictures and can be only operated according to a predetermined operation process.

It can be seen from this embodiment that, required system parameters are directly acquired from an operating system, and a simulation desktop corresponding to the operating system is established by using preset configuration data according to the system parameters, so that the established simulation desktop is basically the same as the operating system in appearance, interface, and the like, which can give a user a strong sense of identification. A function tried on such a simulation desktop can be rapidly and directly located and applied to a corresponding operating system, thereby achieving an effect of effectively helping a user to be familiar with an unfamiliar function in the operating system and improving user experience.

Embodiment 2

Figure 4:
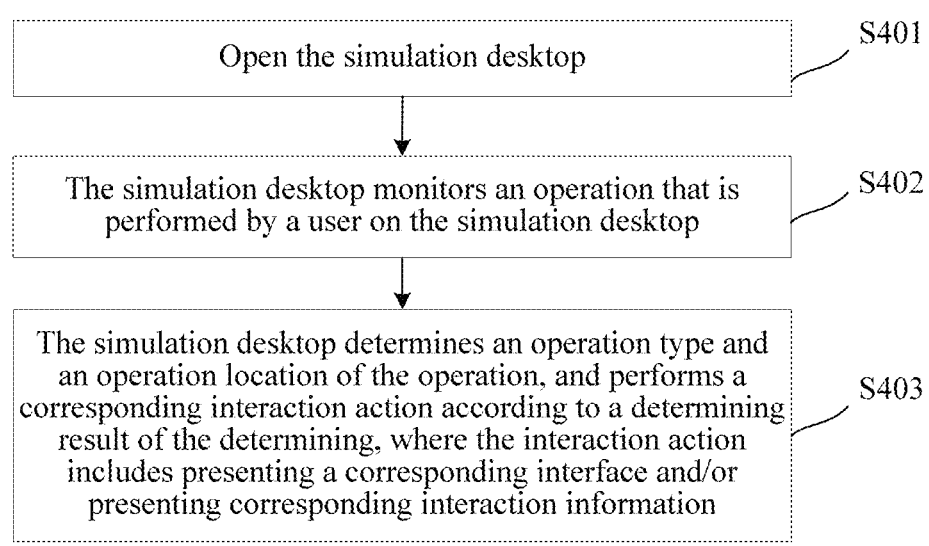
FIG. 4 is a method flowchart 1 of a method for using a simulation desktop according to the present disclosure.

This embodiment describes how to use the simulation desktop established in Embodiment 1 and how to interact with an operation of an operator in detail. Refer to FIG. 4, which is a method flowchart 1 of a method for using a simulation desktop according to the present disclosure. The method includes the following steps:

S401: Open the simulation desktop.

That is, the opened simulation desktop is the simulation desktop established by using any one of specific embodiments of Embodiment 1. For a manner of establishing the simulation desktop, refer to descriptions of Embodiment 1.

S402: The simulation desktop monitors an operation type and an operation location of an operation that is performed by a user on the simulation desktop, where the operation type includes tap or slide.

S403: The simulation desktop determines the operation type and the operation location of the operation, and performs a corresponding interaction action according to a determining result of the determining, where the interaction action includes presenting a corresponding interface and/or presenting corresponding interaction information.

For S402 and S403, it should be noted that, the simulation desktop in the present disclosure monitors all operations that are performed by a user on an interface of the simulation desktop, where the simulation desktop includes operation types and operation locations of these operations, and a monitoring range includes ranges of all interfaces of the simulation desktop, determines a relationship between the operation type and the operation location of the operation and a related function and application in the simulation desktop, and gives a feedback on the operation type and the operation location of the operation of the user according to a determining result of the determining (or, presents a corresponding interface). For example, the user performs a tap operation (an operation type) on a location A (an operation location) on a current interface of the simulation desktop. If the location A is a location at which a shortcut icon of an application X is located, the simulation desktop presents interaction information, an application interface, or the like of the application X according to the operation type (the tap operation). If the location A is not a location at which any function or application in the simulation desktop is located, and the operation type is the tap operation, no interaction action is performed for the operation of the user, or, a corresponding interaction action performed by the simulation desktop for the operation is a no-interaction action. A principle used by the simulation desktop for determining the operation of the user and determining what type of interaction action is performed is similar to a principle used by the operating system. For another example, an interface displayed by the current simulation desktop is a system desktop. If it is detected that the user performs an operation of sliding to the left or right at any location on the interface, and if the simulation desktop has multiple desktops (that is, a current operating system of an intelligent terminal has multiple desktops), the simulation desktop converts the current desktop and presents a corresponding neighboring desktop. If it is detected that the user performs an operation of sliding up or down at any location on the interface, the simulation desktop correspondingly performs an interaction action of presenting a drop-down notification bar or turning a page up or down.

To implement the foregoing function, in a process of establishing the simulation desktop, an appearance (view) of each screen is sequentially added to a pagerAdapter, and the Adapter is put into a viewpager, so as to support left/right slide. Code is as follows:

viewPager.setOnPageChangeListener(myOnPageChangeListener)

The simulation desktop may dynamically generate a simulation notification bar by monitoring an up/down slide event on a screen. Code is as follows:

viewPagerContainer.setOnTouchListener(new OnTouchListener( ))

That is, if the user performs a same operation on a corresponding simulation desktop, a feedback given by the simulation desktop is exactly the same as a feedback that can be generated on the operation in the operating system, so that the user has a basically similar operation sense and experience when using the operating system and using the simulation desktop.

In addition, when the user taps a function or an application, although the simulation desktop does not really open the application, the simulation desktop retrieves corresponding interaction information such as a brief description and presents the interaction information. Presentation may be performed by using a bubble, a pop-up window, or in another form. Content of the interaction information may be presented by using a text, a voice, a picture, or in another form. All these presentation forms and content presentation forms may be defined by the user according to a preference of the user, which is not limited in the present disclosure.

Figure 5:
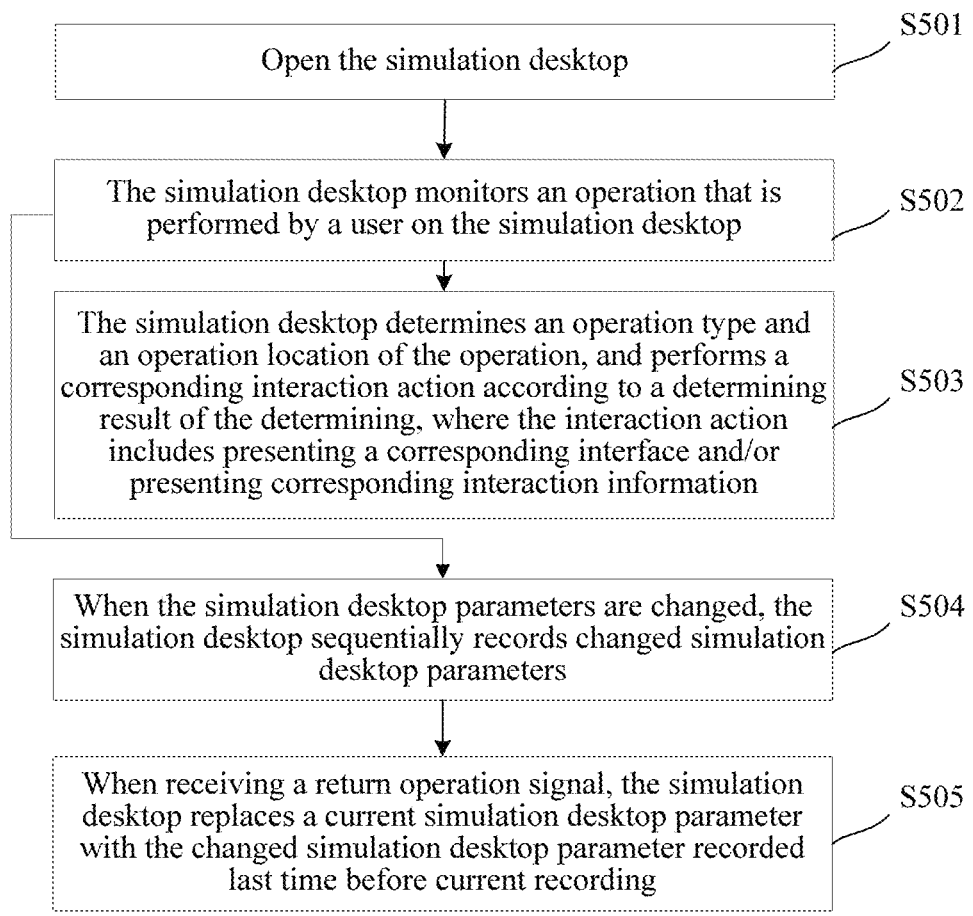
FIG. 5 is a method flowchart 2 of a method for using a simulation desktop according to the present disclosure.

In a process in which the user tries an unfamiliar function, operations mainly performed are mainly operations of changing a type, for example, operations that the user does not dare to try in the operating system before, for example, enabling or disabling a function, switching a mode of a function, modifying a parameter value of a function, and deletion. Operations of this type all cause a change in a parameter, that is, a simulation desktop parameter of the simulation desktop is changed. In addition, the user has a requirement sometimes and hopes to cancel a change made before, for example, hopes to restore a parameter after deletion or hopes to restore an original parameter after a parameter is modified etc. To ensure the requirement of the user, the technical solution of the present disclosure provides a preferred implementation manner in which an operation of the user that causes a change in the simulation desktop parameter is stored. Based on FIG. 4, referring to FIG. 5, the method may further include the following steps:

S501: Open the simulation desktop.

S502: The simulation desktop monitors an operation type and an operation location of an operation that is performed by a user on the simulation desktop, where the operation type includes tap or slide.

S503: The simulation desktop determines the operation type and the operation location of the operation, and performs a corresponding interaction action according to a determining result of the determining, where the interaction action includes presenting a corresponding interface and/or presenting corresponding interaction information.

For an execution order of S504, it should be noted that, S503 is not a necessary step for performing S504. S504 can be performed as long as S502 starts. In this figure, presentation is performed by using an execution order in which S504 starts to be performed after S502 as an example.

S504: When the simulation desktop parameters are changed, the simulation desktop sequentially records changed simulation desktop parameters.

For this step, it should be noted that, changes in the simulation desktop parameters are all caused by operations of the user. Operations that can cause changes in the simulation desktop parameters mainly refer to operations of changing a type, for example, enabling or disabling a function, switching a mode of a function, modifying a parameter value of a function, and deletion. A specific operation type is not limited in the present disclosure.

The sequentially recording changed simulation desktop parameters mainly refers to that: for example, the user tries and modifies a parameter value of a function A in the simulation desktop, and in this case, the simulation desktop records a simulation desktop parameter obtained after the function A is modified; then, the user deletes an application B, and in this case, the simulation desktop records a simulation desktop parameter obtained after the function B is deleted. A time of recording the simulation desktop parameter obtained after the function B is deleted is after a time of recording the simulation desktop parameter obtained after the function A is modified.

S505: When receiving a return operation signal, the simulation desktop replaces a current simulation desktop parameter with the changed simulation desktop parameter recorded last time before current recording.

The return operation signal is a control signal that is generally sent in a case in which after a parameter of the simulation desktop is changed, the user hopes to cancel the change, and that is used to restore a current simulation desktop parameter to a state before the change. An example in S504 is used. After the user deletes the application B, the user hopes to cancel the deletion, and taps a return button on the simulation desktop, which is equivalent to that the user sends a return operation signal, and after receiving the return operation signal, the simulation desktop replaces a current simulation desktop parameter with a simulation desktop parameter recorded last time, that is, the simulation desktop parameter obtained after the function A is modified.

Figure 6:
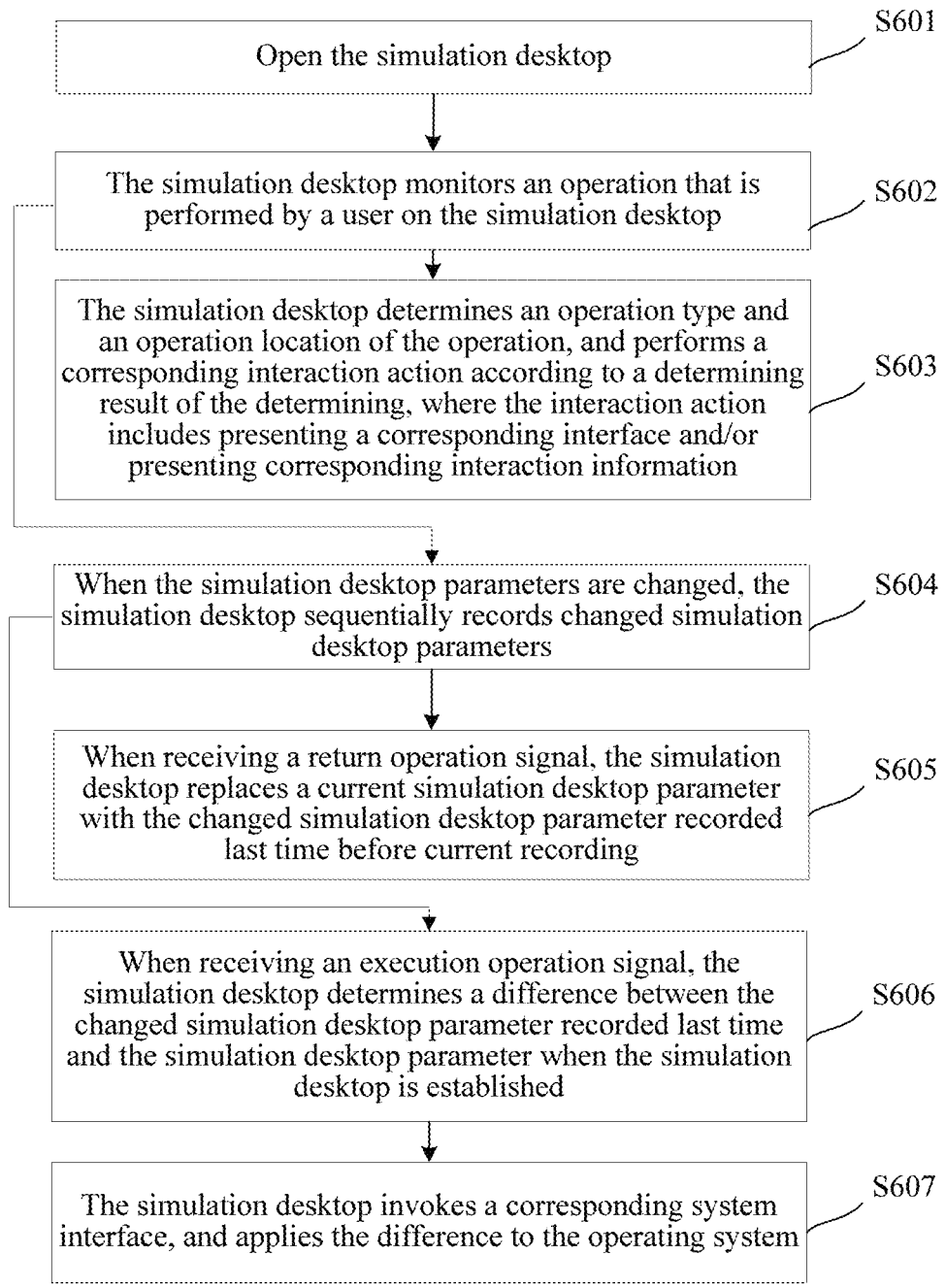
FIG. 6 is a method flowchart 3 of a method for using a simulation desktop according to the present disclosure.

Considering that the user may further have a requirement in use, that is, after trying changes in some system functions, an adjustment in an application, or deletion of an application, the user thinks that the user has already learned and determined impact of a current operation on a system, and hopes to apply an operation performed in a simulation system to the operating system in a same way. Generally, the user needs to exit the simulation desktop first, and then finds a corresponding location in the operating system, and performs, in the operating system again, an operation that is just performed in the simulation desktop. A same operation process needs to be performed twice, which is excessively complex and inflexible. Therefore, to resolve the requirement, to enable the simulation desktop to be more humanized and have a better operation sense, the technical solution of the present disclosure further provides a preferred implementation manner in which an operation, which causes a change in a system parameter, of the user in the simulation desktop is directly applied to the operating system. Based on FIG. 5, referring to FIG. 6, the method includes the following steps:

S601: Open the simulation desktop.

S602: The simulation desktop monitors an operation type and an operation location of an operation that is performed by a user on the simulation desktop, where the operation type includes tap or slide.

S603: The simulation desktop determines the operation type and the operation location of the operation, and performs a corresponding interaction action according to a determining result of the determining, where the interaction action includes presenting a corresponding interface and/or presenting corresponding interaction information.

S604: When the simulation desktop parameters are changed, the simulation desktop sequentially records changed simulation desktop parameters.

S605: When receiving a return operation signal, the simulation desktop replaces a current simulation desktop parameter with the changed simulation desktop parameter recorded last time before current recording.

For an execution order of S606, it should be noted that, S605 is not a necessary step for performing S606. S606 can be performed as long as S604 starts. In this figure, presentation is performed by using an example in which S606 starts to be performed after S604.

S606: When receiving an execution operation signal, the simulation desktop determines a difference between the changed simulation desktop parameter recorded last time and the simulation desktop parameter when the simulation desktop is established.

That is, before the user needs to perform an operation in the operating system, the user may have already made some changes in the simulation desktop, and after an execution operation signal sent by the user is received, it is determined that, from the simulation desktop is opened to now, how many changes that cause a change in an initial simulation desktop parameter are made in total, for example, enabling or disabling a function, switching a mode of a function, modifying a parameter value of a function, and deletion.

S607: The simulation desktop invokes a corresponding system interface, and applies the difference to the operating system.

That is, when finishing an operation, the user may choose to apply all changes made by the user in the simulation desktop to the operating system. After receiving the execution operation signal, the simulation desktop sends different broadcast to corresponding system settings in the background, to enable a change made by the user in the simulation desktop to take effects in the operating system. Subsequently, how the simulation desktop directly applies the change made by the user to the operating system is described by using an actual application scenario as an example. For example, the user hopes to apply a modification on an on/off item of a function in a system setting in the simulation desktop to the operating system by directly using a function of the simulation desktop. The following is a necessary code structure for implementing the function:

```
a field of the on/off item in a system table:
private final static String
COLUMN_USER_EXPERIENCE_INVOLVED =
"user_experience_involved";
private final static String
```

-continued

```
COLUMN_USER_EXPERIENCE_WIFIONLY =
"user_experience_wifionly";
acquire a switch of the operating system:
(Settings.Scure.getInt(this.getContentResolver( ),
COLUMN_USER_EXPERIENCE_INVOLVED, 0) == 1);
set the switch of the operating system:
Settings.Secure.putInt(this.getContentResolver( ),
COLUMN_USER_EXPERIENCE_INVOLVED,
agreeBox.isChecked( ) ? 1 : 0);
Settings.Secure.putInt(this.getContentResolver( ),
COLUMN_USER_EXPERIENCE_WIFIONLY,
wifionlyBox.isChecked( ) ? 1 : 0);
)
```

It can be seen that, the simulation desktop also applies a modification made by the user in the simulation desktop to the operating system by invoking a corresponding port of the on/off item. For example, if the user uninstalls an application A in the simulation desktop, by means of an embodiment shown in FIG. 6, the uninstallation may be directly applied to the operating system, so that the simulation desktop also uninstalls the application A in the operating system. Alternatively, if the user opens a Bluetooth switch in the simulation desktop and closes a wireless network switch, similarly, by means of the embodiment shown in FIG. 6, the simulation desktop opens a Bluetooth switch in the operating system and closes a wireless network switch in the operating system. These operations performed by the user in the simulation desktop can take effects in the operating system by directly using the simulation system without a need of being performed by the user again in the operating system.

It can be seen from this embodiment that, according to the simulation desktop in the present disclosure, the concept of a specified area is not set, all operations performed by the user on an interface of a presented simulation desktop are listened to, a feedback on the operation is basically the same as that when the user operates the operating system, moreover, an operation order or an experience process is not fixed, and the user may perform a tap/slide operation and try in the interface according to a requirement of the user, and may directly learn a function that the user needs to learn, thereby further improving practicality of a simulation system.

Embodiment 3

Figure 7:
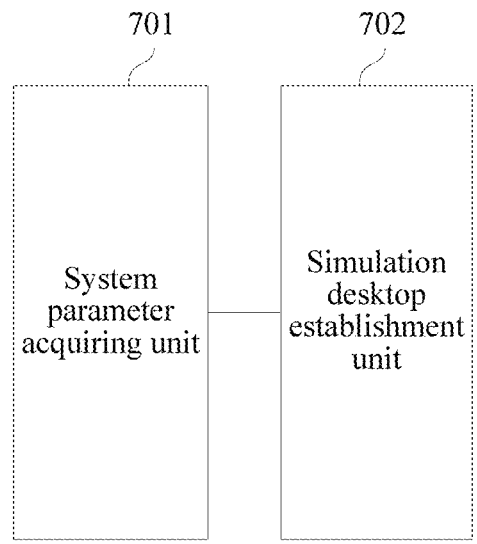
FIG. 7 is an apparatus structural diagram 1 of a simulation desktop establishment apparatus according to the present disclosure.

This embodiment is an apparatus embodiment corresponding to Embodiment 1. As shown in FIG. 7, FIG. 7 is an apparatus structural diagram 1 of a simulation desktop establishment apparatus according to the present disclosure. The apparatus includes:

A system parameter acquiring unit 701 is configured to acquire system parameters of a current operating system.

That is, for intelligent terminals of different users, the system parameter acquiring unit 701 acquires system parameters of an operating system with allowed permission. The operating system described herein refers to an operating system currently running in the intelligent terminal, for example, an Android system, or an iOS system. The system parameters mainly include a parameter of an installed application, a system setting parameter, and a parameter of a UI of a system. The acquired system parameters are used as a parameter basis of establishing a simulation desktop, for example, a system desktop parameter in the system parameters is used as a system desktop parameter of the simulation desktop, and a setting parameter, which is related to a system setting, in the system parameters is used as a system setting parameter of a system setting of the simulation desktop, and therefore, the generated simulation desktop may have an effect basically similar to that of the current operating system.

Subsequently, how to acquire system parameters is described by using an example. For example, for a Huawei intelligent terminal in which an Android system is installed, the system parameter acquiring unit 701 first invokes an interface module with allowed permission, acquires system parameters of the Android system from a system interface, and may acquire, from the intelligent terminal by reading data in content://com.huawei.android.launcher.settings/favorites of a launcher, parameters such as a name, a packet name, a class name, a located screen (screen), a horizontal coordinate (cellX), a longitudinal coordinate (cellY), a size (spanX, spanY) of an occupied unit, a desktop wallpaper, and a notification bar of an application installed in the intelligent terminal.

For composition of the system parameters, the technical solution of the present disclosure provides a preferred combination manner. The system parameters include a setting parameter used to describe a setting of the operating system, a system desktop parameter used to describe a desktop of the operating system, and an application parameter used to describe an installed application in the operating system. Based on the composition manner, a simulation desktop establishment unit 702 has a corresponding process of generating the simulation desktop, and a specific process is described in the simulation desktop establishment unit 702 in detail. In addition, it should be noted that, specific composition of the system parameters is not limited in the present disclosure.

For a computer coding mode for implementing the foregoing function, the XML is preferably used for compiling, or another computer language may be used for compiling, which is not limited in the present disclosure. For ease of description, in this embodiment, examples of encoding are all based on the xml.

The simulation desktop establishment unit 702 is configured to establish a simulation desktop by using preset configuration data according to the system parameters, where content of simulation desktop parameters of the established simulation desktop is the same as content of the system parameters.

Herein, it should be noted that, the configuration data in the simulation desktop establishment unit 702 has a user-defined function, that is, the configuration data may be user-defined in a particular function range. The user-defined function mainly includes setting an interaction manner, an interaction type, an interaction action between the simulation desktop and a user, which may all be defined by the user in advance, so that a finally generated simulation desktop more meets a preference of the user, and is more humanized. For a code structure of the configuration data in the simulation desktop establishment unit 702, refer to the following example:

```
<!--interaction mode-->
<!--interaction mode type, eg: a bubble prompt pops up, and a toast prompt pops up-->
<!--interaction action, eg: tap and slide-->
<!--during interaction, display a form of prompt content, eg: a picture, a text, or a voice-->
     <InteractMode>
         <type>paopao</type>
         <action>click</action>
         <content>picture</content>
     </InteractMode>
<!--system application -->
     <Elements>
<!--single application -->
<!--an application id, an application name, an application icon, a brief description of an application, a detailed description of an address of the application, a packet name and a class name of the application-->
     <Element>
     <eid>1</eid>
     <name>telephone</name>
     <iconSrc>dialtactsactivity</iconSrc>
     <info>make a call, check call records, and set attributes of a voice mailbox, an
     IP telephone, and an Internet call</info>
     <url>product_content/call/topic_phone_call.html</url>
     <packetName>com.android.contacts</packetName>
     <className>com.android.contacts.activities.DialtactsActivity</className>
     </Element>
     <Element>
     <eid>2</eid>
     <name>information</name>
     <iconSrc>message</iconSrc>
     <info>send and receive a short message service message and a multimedia
     message, and a free network message may be sent by registering with
     TTchat</info>
     <url>product_content/message/topic_exchange_message.html</url>
     <packetName>com.huawei.message</packetName>
     <className>com.hotalk.ui.homepage.messagegroup.HWMessageGroup
     Activity</className>
     </Element>
```

A part about how to interact with the user is described in detail in Embodiment 4.

In an actual operation, the simulation desktop establishment unit 702 uses the system parameters as input data, that is, uses the system parameters as initial simulation desktop parameters of the simulation desktop, and the simulation desktop that can correspond to the operating system is rapidly generated according to the preset configuration data. As shown in FIG. 2a and FIG. 2b, FIG. 2a presents a desktop of an operating system of an intelligent terminal, and FIG. 2b presents a simulation desktop corresponding to the operating system shown in FIG. 2a. It can be seen that, the simulation desktop displayed in FIG. 2b is basically the same as the operating system in 2a in appearance, and moreover, feedbacks on an operation of a user are also basically the same, for example, feedbacks on tap on an application icon by the user, and up/down slide and left/right slide on a system desktop in the simulation desktop are all the same as feedbacks on same operations performed in the operating system.

When the system parameters acquired by the system parameter acquiring unit 701 preferably specifically include the setting parameter used to describe the setting of the operating system, the system desktop parameter used to describe the desktop of the operating system, and the application parameter used to describe the installed application in the operating system, in the present disclosure, there is a corresponding simulation desktop generation process according to such specific composition of the system parameters.

The establishing, by the simulation desktop establishment unit 702, a simulation desktop by using the configuration data and the desktop configuration parameter according to the system parameters includes: acquiring, by the simulation desktop establishment unit 702, a desktop quantity and a desktop background of the operating system, an application name, location coordinates, and a size of an occupied desktop of an application on each desktop of the operating system, and current setting content of the operating system according to the setting parameter, the system desktop parameter, and the application parameter; and establishing the simulation desktop by using the desktop configuration parameter according to the desktop quantity and the desktop background of the operating system, the application name, the location coordinates, and the size of the occupied desktop of the application on each desktop of the operating system, and the current setting content of the operating system.

A manner of acquiring, by the simulation desktop, the desktop quantity and the desktop background of the operating system, the application name, the location coordinates, and the size of the occupied desktop of the application on each desktop of the operating system, and the current setting content of the operating system is not limited in the present disclosure, which may be acquired preferably in the following manner: the simulation desktop establishment unit 702 acquires the desktop quantity and the desktop background of the operating system according to the system desktop parameter; the simulation desktop establishment unit 702 acquires the application name, the location coordinates, and the size of the occupied desktop of the application on each desktop of the operating system according to the system desktop parameter and the application parameter; the simulation desktop establishment unit 702 acquires the current setting content of the operating system according to the setting parameter; and the simulation desktop establishment unit 702 establishes, according to the desktop quantity and the desktop background of the operating system, the application name, the location coordinates, and the size of the occupied desktop of the application on each desktop of the operating system, and the current setting content of the operating system, the simulation desktop having the same setting parameter, system desktop parameter, and application parameter as the operating system.

That is, the simulation desktop is established totally according to system parameters of the current operating system of the intelligent terminal, and has a same setting parameter, system desktop parameter, and application parameter as the operating system. Specifically, the desktop quantity and the desktop background of the simulation desktop are both the same as those of the operating system, the application name, the location coordinates, and the size of the occupied desktop of each application on the desktop of the simulation desktop are all the same as those of the operating system, and the current setting content of the simulation desktop is the same as that of the operating system.

Figure 8:
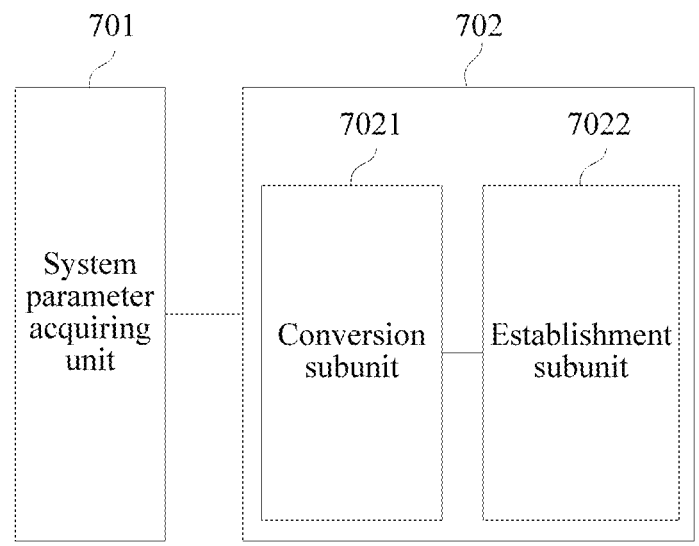
FIG. 8 is an apparatus structural diagram 2 of a simulation desktop establishment apparatus according to the present disclosure.

After acquiring the system parameters, the simulation desktop establishment unit 702 performs corresponding encoding processing and a data format conversion according to a data structure requirement, that is, based on FIG. 7, the simulation desktop establishment unit 702 may further include a conversion subunit 7021 and an establishment subunit 7022, where, as shown in FIG. 8, the conversion subunit 7021 converts, according to the configuration data, data structures of the system parameters into data structures used to establish the simulation desktop; and the establishment subunit 7022 establishes the simulation desktop according to the system parameters whose data structures are converted.

In the simulation desktop, data structures of some corresponding system parameters are converted as follows:

A data structure of each installed application (which includes necessary information such as a name, an image, a location, and an icon size of the application) is:

```
//current screen id
private int mID;
//horizontal coordinate
private int mCellX;
//longitudinal coordinate
private int mCellY;
//a quantity of occupied space units in a horizontal direction
private int mSpanX;
//a quantity of occupied space units in a longitudinal direction
private int xSpanY;
//application icon
private String mIconName;
//application name
private String mAppName;
//a brief description of an application
private String mAppInfo;
//corresponding information url
private String mUrl;
//packet name and class name
private String mPackageName;
private String mClassName;
a data structure of a single screen is:
public class Screen {
    //including multiple application icons
    private List<Element> elements= new ArrayList<Element>( );
    //current screen id
    private int mSrceenID; and
data structures of multiple screens are:
public class EmuiIntroduce {
/**
*including multiple screens
*/
private List<Screen> mScreens = new ArrayList<Screen>( );
    /**
    *a quantity of icons in each row
    */
    private int rowElementNumbers;
```

In addition to needing to acquire the system parameters to perform data structure conversion to establish the simulation desktop, according to functions and applications in the acquired system parameters, interaction information corresponding to these functions and applications may be further acquired, where the interaction information mainly includes brief descriptions, related interfaces, descriptions of features of the corresponding functions or applications. A time of acquiring the interaction information may be a time before the simulation desktop is generated, or may be a time after the simulation desktop is generated, which is not limited in the present disclosure. Based on FIG. 7 or FIG. 8, preferably, the simulation desktop establishment apparatus may further include an interaction information acquiring unit 900, and FIG. 7 is used as an example, as shown in FIG. 9, the interaction information acquiring unit 900 is configured to acquire interaction information that corresponds to a system function and the installed application and that is included in the system parameters, where the interaction information includes a function description of the corresponding system function or application.

Figure 9:
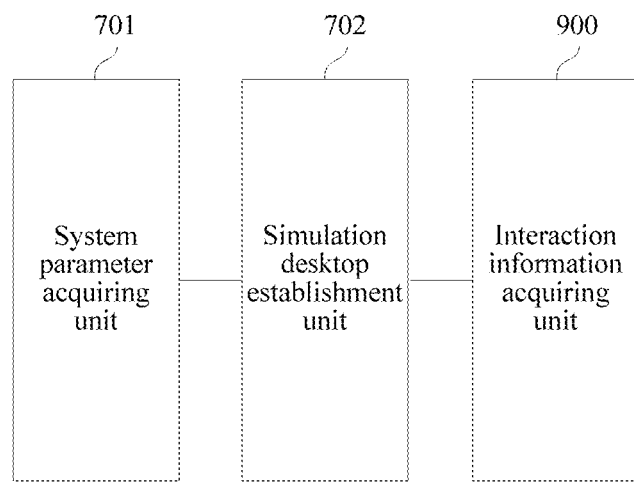
FIG. 9 is an apparatus structural diagram 3 of a simulation desktop establishment apparatus according to the present disclosure.

It should be noted that, FIG. 9 shows an order in which the interaction information acquiring unit 900 is triggered after the simulation desktop establishment unit 702 is triggered, but the interaction information acquiring unit 900 is not necessarily triggered after the simulation desktop establishment unit 702 is triggered, and actually, the interaction information acquiring unit 900 only needs to be triggered after the system parameter acquiring unit 701 is triggered, that is, after the system parameter acquiring unit 701 acquires the system parameters, that is, reflected in an actual operation of the simulation desktop, the interaction information may be acquired in a process of establishing the simulation desktop, or may be automatically or manually updated after the simulation desktop is established.

Herein, all of the acquired interaction information may be stored locally, or only a url address or another form corresponding to the interaction information may be stored. When a user triggers a function or an application that corresponds to the interaction information, content of the interaction information is retrieved and presented on the simulation desktop (if only the url address of the interaction information is stored, when the content of the interaction information needs to be presented, the url address is accessed, and content of a page at the url address is presented). Presentation may be performed by using a bubble, a pop-up window, or in another form. The content of the interaction information may be presented by using a text, a voice, a picture, or in another form. All these presentation forms and content presentation forms may be defined by the user according to a preference of the user, which is not limited in the present disclosure.

In the intelligent terminal, the simulation desktop established in this embodiment of the present disclosure may include all functions and applications, which are installed in the current operating system of the user, of the intelligent terminal. That is, an unfamiliar function or application, which the user wants to learn, of the intelligent terminal certainly exists in the established simulation desktop. The user may directly tap or find the function or the application, which the user wants to learn, on the simulation desktop, and correspondingly try or be familiar with the function by using interaction information that corresponds to the function or the application and that is presented on the simulation desktop. After the operating system is returned to, because the simulation desktop and the operating system has a high similarity, the user may find right away a location of the function or the application that is just operated, thereby achieving an effect of rapidly learning the operating system. Such an intuitive and rapid manner is incompatible to some approaches in which a simulation desktop is established by using pictures and can be only operated according to a predetermined operation process.

Embodiment 4

Figure 10:
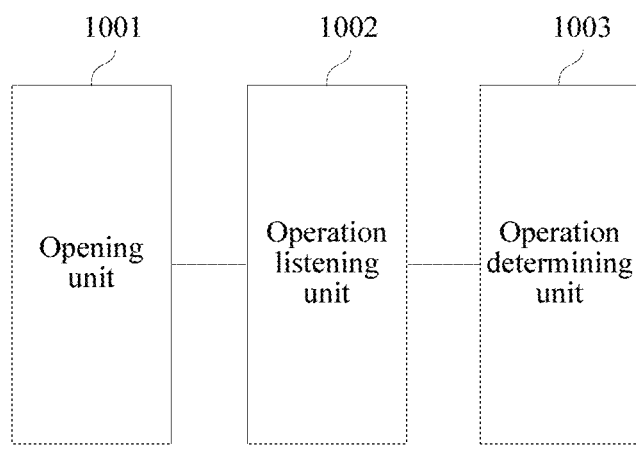
FIG. 10 is an apparatus structural diagram 1 of an apparatus for using a simulation desktop according to the present disclosure.

This embodiment is an apparatus embodiment corresponding to Embodiment 2. As shown in FIG. 10, FIG. 10 is an apparatus structural diagram 1 of an apparatus for using a simulation desktop according to the present disclosure. The apparatus includes:

An opening unit 1001 configured to open the simulation desktop.

That is, the opened simulation desktop is the simulation desktop established by using any one of preferred embodiments of Embodiment 3. For a manner of establishing the simulation desktop, refer to descriptions of Embodiment 3.

An operation monitoring unit 1002 is configured to monitor an operation type and an operation location of an operation that is performed by a user on the simulation desktop, where the operation type includes tap or slide.

An operation determining unit 1003 is configured to determine the operation type and the operation location of the operation, and perform a corresponding interaction action according to a determining result of the determining, where the interaction action includes presenting a corresponding interface and/or presenting corresponding interaction information.

For the operation monitoring unit 1002 and the operation determining unit 1003, it should be noted that, the simulation desktop in the present disclosure monitors all operations that are performed by a user on an interface of the simulation desktop, where the simulation desktop includes operation types and operation locations of these operations, and a monitoring range includes ranges of all interfaces of the simulation desktop, determines a relationship between the operation type and the operation location of the operation and a related function and application in the simulation desktop, and gives a feedback on the operation type and the operation location of the operation of the user according to a determining result of the determining (or, presents a corresponding interface). For example, the user performs a tap operation (an operation type) on a location A (an operation location) on a current interface of the simulation desktop. If the location A is a location at which a shortcut icon of an application X is located, the simulation desktop presents interaction information, an application interface, or the like of the application X according to the operation type (the tap operation). If the location A is not a location at which any function or application in the simulation desktop is located, and the operation type is the tap operation, no interaction action is performed for the operation of the user, or, a corresponding interaction action performed by the simulation desktop for the operation is a no-interaction action. A principle used by the simulation desktop for determining the operation of the user and determining what type of interaction action is performed is similar to a principle used by the operating system. For another example, an interface displayed by the current simulation desktop is a system desktop. If the operation monitoring unit 1002 detects that the user performs an operation of sliding to the left or right at any location on the interface, and if the simulation desktop has multiple desktops (that is, a current operating system of an intelligent terminal has multiple desktops), the operation determining unit 1003 converts the current desktop of the simulation desktop and presents a corresponding neighboring desktop. If the operation monitoring unit 1002 detects that the user performs an operation of sliding up or down at any place of the interface, the operation determining unit 1003 correspondingly performs an interaction action of presenting a drop-down notification bar or turning a page up or down in the simulation desktop.

To implement the foregoing function, in a process of establishing the simulation desktop, an appearance (view) of each screen is sequentially added to a pagerAdapter, and the Adapter is put into a viewpager, so as to support left/right slide. Code is as follows:

viewPager.setOnPageChangeListener(myOn-PageChangeListener)

The simulation desktop may dynamically generate a simulation notification bar by monitoring an up/down slide event on a screen. Code is as follows:

viewPagerContainer.setOnTouchListener(new OnTouchListener( ))

That is, if the user performs a same operation on a corresponding simulation desktop, a feedback given by the simulation desktop is exactly the same as a feedback that can be generated on the operation in the operating system, so that the user has a basically similar operation sense and experience when using the operating system and using the simulation desktop.

In addition, when the user taps a function or an application, although the operation determining unit 1003 does not really open the application, the operation determining unit 903 retrieves corresponding interaction information such as a brief description and presents the interaction information. Presentation may be performed by using a bubble, a pop-up window, or in another form. Content of the interaction information may be presented by using a text, a voice, a picture, or in another form. All these presentation forms and content presentation forms may be defined by the user according to a preference of the user, which is not limited in the present disclosure.

Figure 11:
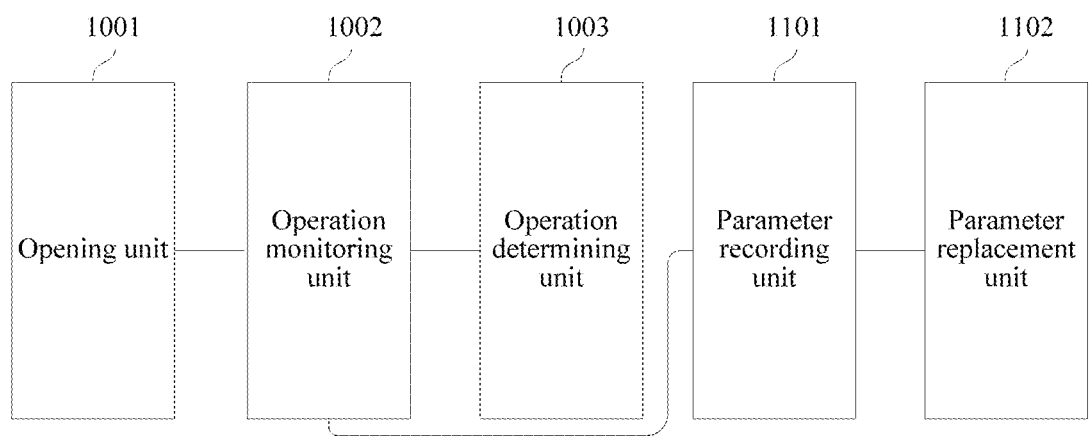
FIG. 11 is an apparatus structural diagram 2 of an apparatus for using a simulation desktop according to the present disclosure.

In a process in which the user tries an unfamiliar function, operations mainly performed are mainly operations of changing a type, for example, operations that the user does not dare to try in the operating system before, for example, enabling or disabling a function, switching a mode of a function, modifying a parameter value of a function, and deletion. Operations of this type all cause a change in a parameter, that is, a simulation desktop parameter of the simulation desktop is changed. In addition, the user has a requirement sometimes and hopes to cancel a change made before, for example, hopes to restore a parameter after deletion or hopes to restore an original parameter after a parameter is modified. To ensure the requirement of the user, the technical solution of the present disclosure provides a preferred implementation manner in which an operation of the user that causes a change in the simulation desktop parameter is stored. Based on FIG. 10, referring to FIG. 11, the apparatus further includes: a parameter recording unit 1101 configured to: when the simulation desktop parameters are changed, sequentially record changed simulation desktop parameters.

For a trigger order of the parameter recording unit 1101, it should be noted that, the operation determining unit 1003 is not a necessary condition for triggering the parameter recording unit 1101. The parameter recording unit 1101 may be triggered can be triggered as long as the operation monitoring unit 1002 is triggered. In this figure, presentation is performed by using a trigger order in which the parameter recording unit 1101 is triggered after the operation monitoring unit 1002 starts to be triggered as an example.

It should be noted that, it should be noted that, changes in the simulation desktop parameters are all caused by operations of the user. Operations that can cause changes in the simulation desktop parameters mainly refer to operations of changing a type, for example, enabling or disabling a function, switching a mode of a function, modifying a parameter value of a function, and deletion. A specific operation type is not limited in the present disclosure.

The sequentially recording changed simulation desktop parameters mainly refers to that: for example, the user tries and modifies a parameter value of a function A in the simulation desktop, and in this case, the parameter recording unit 1101 records a simulation desktop parameter obtained after the function A is modified; then, the user deletes an application B, and in this case, the parameter recording unit 1101 records a simulation desktop parameter obtained after the function B is deleted. A time of recording the simulation desktop parameter obtained after the function B is deleted is after a time of recording the simulation desktop parameter obtained after the function A is modified.

A parameter replacement unit 1102 is configured to: when receiving a return operation signal, replace a current simulation desktop parameter with the changed simulation desktop parameter recorded last time before current recording.

The return operation signal is a control signal that is generally sent in a case in which after a parameter of the simulation desktop is changed, the user hopes to cancel the change, and that is used to restore a current simulation desktop parameter to a state before the change. An example in the parameter recording unit 1101 is used. After the user deletes the application B, the user hopes to cancel the deletion, and taps a return button on the simulation desktop, which is equivalent to that the user sends a return operation signal, and after receiving the return operation signal, the parameter replacement unit 1102 replaces a current simulation desktop parameter with a simulation desktop parameter recorded last time, that is, the simulation desktop parameter obtained after the function A is modified.

Figure 12:
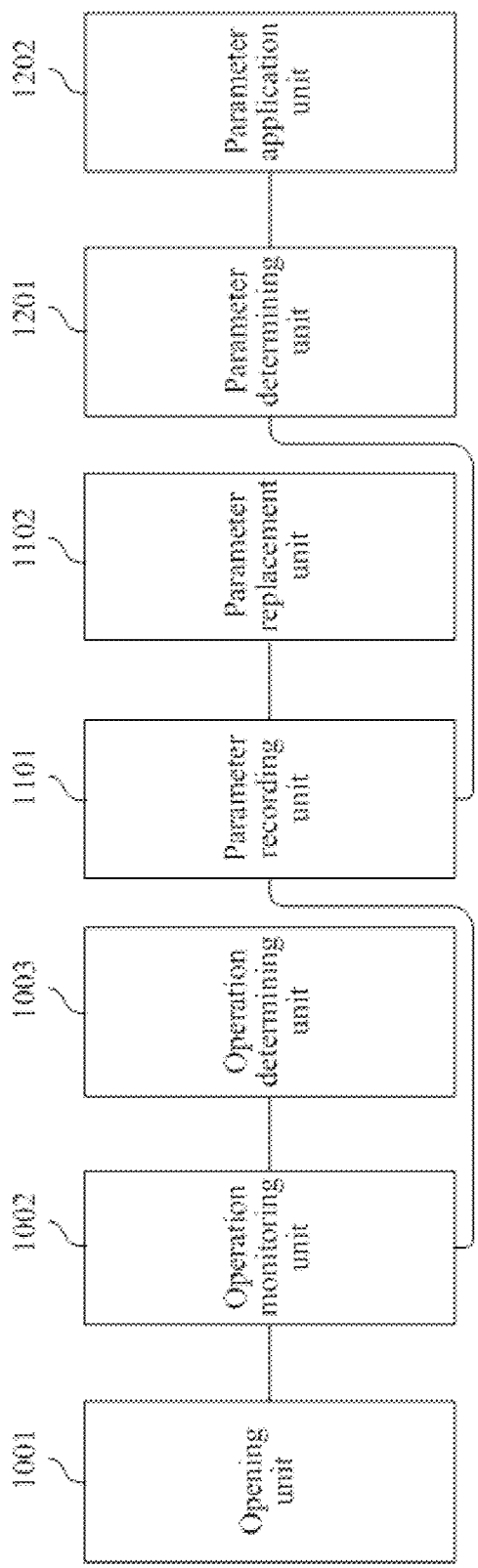
FIG. 12 is an apparatus structural diagram 3 of an apparatus for using a simulation desktop according to the present disclosure.

Considering that the user may further have a requirement in use, that is, after trying changes in some system functions, an adjustment in an application, or deletion of an application, the user thinks that the user has already learned and determined impact of a current operation on a system, and hopes to apply an operation performed in a simulation system to the operating system in a same way. Generally, the user needs to exit the simulation desktop first, and then finds a corresponding location in the operating system, and performs, in the operating system again, an operation that is just performed in the simulation desktop. A same operation process needs to be performed twice, which is excessively complex and inflexible. Therefore, to resolve the requirement, to enable the simulation desktop to be more humanized and have a better operation sense, the technical solution of the present disclosure further provides a preferred implementation manner in which an operation, which causes a change in a system parameter, of the user in the simulation desktop is directly applied to the operating system. Based on FIG. 11, referring to FIG. 12, the apparatus further includes:

A parameter determining unit 1201 is configured to: when receiving an execution operation signal, the simulation desktop determines a difference between the changed simulation desktop parameter recorded last time and the simulation desktop parameter when the simulation desktop is established.

For a trigger order of the parameter determining unit 1201, it should be noted that, the parameter replacement unit 1102 is not a necessary apparatus for triggering the parameter determining unit 1201. The parameter determining unit 1201 may be triggered as long as the parameter recording unit 1101 starts. In this figure, presentation is performed by using in which the parameter determining unit 1201 starts to be triggered after the parameter recording unit 1101 is triggered as example.

That is, before the user needs to perform an operation in the operating system, the user may have already made some changes in the simulation desktop, and after an execution operation signal sent by the user is received, it is determined that, from the simulation desktop is opened to now, how many changes that cause a change in an initial simulation desktop parameter are made in total, for example, enabling or disabling a function, switching a mode of a function, modifying a parameter value of a function, and deletion.

A parameter application unit 1202 is configured to invoke a corresponding system interface, and apply the difference to the operating system.

That is, when finishing an operation, the user may choose to apply all changes made by the user in the simulation desktop to the operating system. After receiving the execution operation signal, the parameter application unit 1202 sends different broadcast to corresponding system settings in the background, to enable a change made by the user in the simulation desktop to take effects in the operating system. Subsequently, how the simulation desktop directly applies the change made by the user to the operating system is described by using an actual application scenario as an example. For example, the user hopes to apply a modification on an on/off item of a function in a system setting in the simulation desktop to the operating system by directly using a function of the simulation desktop. The following is a necessary code structure for implementing the function:

```
a field of the on/off item in a system table:
private final static String
COLUMN_USER_EXPERIENCE_INVOLVED =
"user_experience_involved";
private final static String
COLUMN_USER_EXPERIENCE_WIFIONLY =
"user_experience_wifionly";
acquire a switch of the operating system:
(Settings.Secure.getInt(this.getContentResolver( ),
COLUMN_USER_EXPERIENCE_INVOLVED, 0) == 1);
set the switch of the operating system:
Settings.Secure.putInt(this.getContentResolver( ),
COLUMN_USER_EXPERIENCE_INVOLVED,
agreeBox.isChecked( ) ? 1 : 0);
Settings.Secure.putInt(this.getContentResolver( ),
COLUMN_USER_EXPERIENCE_WIFIONLY,
wifionlyBox.isChecked( ) ? 1 : 0);
)
```

It can be seen that, the parameter application unit 1202 also applies a modification made by the user in the simulation desktop to the operating system by invoking a corresponding port of the on/off item. For example, if the user uninstalls an application A in the simulation desktop, by means of an embodiment shown in FIG. 12, the uninstallation may be directly applied to the operating system, so that the parameter application unit 1202 also uninstalls the application A in the operating system. Alternatively, if the user opens a Bluetooth switch in the simulation desktop and closes a wireless network switch, similarly, by means of the embodiment shown in FIG. 12, the parameter application unit 1202 opens a Bluetooth switch in the operating system and closes a wireless network switch in the operating system. These operations performed by the user in the simulation desktop can take effects in the operating system by directly using the parameter determining unit 1201 and the parameter application unit 1202 without a need of being performed by the user again in the operating system.

Embodiment 5

Figure 13:
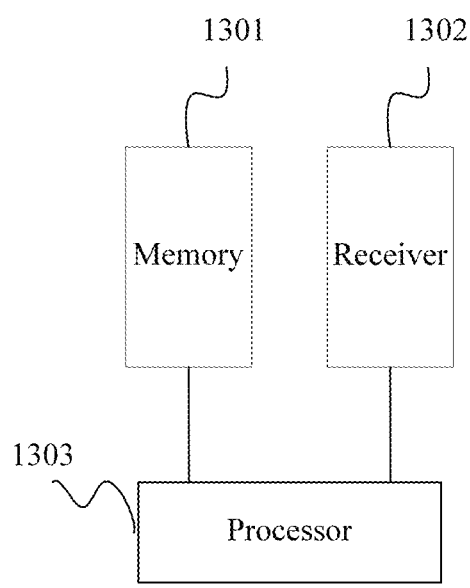
FIG. 13 is a schematic diagram of hardware composition of a terminal according to the present disclosure.

Further, this embodiment of the present disclosure further provides hardware composition of a terminal configured to establish a simulation desktop. Refer to FIG. 13, which is a schematic diagram of hardware composition of a terminal according to the present disclosure. The terminal includes a memory 1301, a receiver 1302, and a processor 1303 separately connected to the memory 1301 and the receiver 1302.

The memory 1301 is configured to store a program, where the program is specifically: acquiring system parameters of a current operating system; and establishing a simulation desktop by using preset configuration data according to the system parameters, where content of simulation desktop parameters of the established simulation desktop is the same as content of the system parameters.

The processor 1303 is configured to read and perform the program stored in the memory, which is specifically: acquiring system parameters of a current operating system; and establishing a simulation desktop by using preset configuration data according to the system parameters, where content of simulation desktop parameters of the established simulation desktop is the same as content of the system parameters.

The receiver 1302 is configured to acquire the system parameters of the current operating system.

Based on the foregoing descriptions of the implementation manners, a person skilled in the art may clearly understand that some or all steps of the methods in the embodiments may be implemented by software in addition to a necessary universal hardware platform. Based on such an understanding, the technical solutions of the present disclosure may be implemented in a form of a software product. The computer software product may be stored in a non-transitory storage medium, such as a read-only memory (ROM)/random-access memory (RAM), a magnetic disk, or an optical disc, and includes several instructions for instructing a computer device (which may be a personal computer, a server, or a network device such as media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely exemplary embodiments of the present disclosure, but are not intended to limit the protection scope of the present disclosure. It should be noted that a person of ordinary skill in the art may make certain improvements and polishing without departing from the principle of the present disclosure and the improvements and polishing shall fall within the protection scope of the present application.

What is claimed is:

1. A simulated desktop establishment method implemented by a terminal, the method comprising:
    acquiring, by the terminal, a system parameter of an operating system of the terminal that comprises multiple desktops, wherein the system parameter indicates that the operating system of the terminal comprises the multiple desktops;
    determining a first number of the multiple desktops of the operating system of the terminal; and
    establishing, by the terminal, a simulated desktop on the terminal using preset configuration data according to the system parameter, wherein the simulated desktop simulates the multiple desktops of the operating system, wherein first content of a simulated desktop parameter of the simulated desktop is the same as second content of the system parameter, and wherein a second number of desktops of the simulated desktop is the same as the first number of the multiple desktops of the operating system.

2. The method of claim 1, wherein the system parameter comprises a setting parameter describing a setting of the operating system, a system desktop parameter describing the multiple desktops of the operating system, and an application parameter describing an installed application in the operating system, and wherein establishing the simulated desktop comprises:
    acquiring a desktop quantity and a desktop background of the operating system, an application name, location coordinates, and a size of an occupied desktop of an application on the multiple desktops, and current setting content of the operating system according to the setting parameter, the system desktop parameter, and the application parameter; and
    further establishing the simulated desktop using the preset configuration data according to the desktop quantity, the desktop background, the application name, the location coordinates, the size, and the current setting content.

3. The method of claim 1, wherein establishing the simulated desktop comprises:
    converting, according to the preset configuration data, first data structures of the system parameter into second data structures used to establish the simulated desktop; and
    further establishing the simulated desktop according to the system parameter whose data structures are converted.

4. The method of claim 1, further comprising acquiring, from the system parameter, interaction information corresponding to a system function and an application, wherein the interaction information comprises a function description of the system function.

5. The method of claim 1, further comprising:
    opening the simulated desktop;
    monitoring an operation type and an operation location of an operation performed on the simulation desktop, wherein the operation type comprises a tap or a slide;
    determining the operation type and the operation location; and
    presenting an interface or interaction information in response to the determining the operation type and the operation location.

6. The method of claim 5, further comprising:
    sequentially recording a changed simulated desktop parameter when the simulated desktop parameter changes; and
    replacing a current simulated desktop parameter with a last-recorded changed simulated desktop parameter when receiving a return operation signal.

7. The method of claim 6, further comprising:
    determining a difference between the last-recorded changed simulated desktop parameter and a first simulated desktop parameter from when the simulated desktop was established;
    invoking a system interface; and
    applying the difference to the operating system.

8. A non-transitory computer-readable medium storing instructions that, when executed by a processor, cause a terminal to:
    acquire a system parameter of an operating system of the terminal that comprises multiple desktops, and wherein the system parameter indicates that the operating system of the terminal comprises the multiple desktops;
    determine a first number of the multiple desktops of the operating system of the terminal; and
    establish a simulated desktop on the terminal using preset configuration data according to the system parameter, wherein the simulated desktop simulates the multiple desktops of the operating system, wherein first content of a simulated desktop parameter of the simulated desktop is the same as second content of the system parameter, and wherein a second number of desktops of the simulated desktop is the same as the first number of the multiple desktops of the operating system.

9. The non-transitory computer-readable medium of claim 8, wherein the system parameter comprises a setting parameter describing a setting of the operating system, a system desktop parameter describing the multiple desktops of the operating system, and an application parameter describing an installed application in the operating system.

10. The non-transitory computer-readable medium of claim 9, wherein the instructions are further configured to cause the terminal to be configured to:
    acquire a desktop background of the multiple desktops of the operating system, an application name, location coordinates, and a size of an occupied desktop of an application on the multiple desktops of the operating system, and current setting content of the operating system according to the setting parameter, the system desktop parameter, and the application parameter; and
    further establish the simulated desktop using the preset configuration data according to the first number of the multiple desktops of the operating system, the desktop background, the application name, the location coordinates, the size, and the current setting content.

11. The non-transitory computer-readable medium of claim 8, wherein the instructions are further configured to cause the terminal to be configured to:
    convert, according to the preset configuration data, first data structures of the system parameter into second data structures used to establish the simulated desktop; and establish the simulated desktop according to the system parameter whose data structures are converted.

12. The non-transitory computer-readable medium of claim 8, wherein the instructions further cause the terminal to be configured to acquire, from the system parameter, interaction information corresponding to a system function and an application, wherein the interaction information comprises a function description of the system function or the application.

13. The non-transitory computer-readable medium of claim 8, wherein the instructions further cause the terminal to be configured to:
open the simulated desktop;
monitor an operation type and an operation location of an operation performed on the simulated desktop, wherein the operation type comprises a tap or a slide;
determine the operation type and the operation location; and
present an interface or interaction information in response to determining the operation type and the operation location.

14. The non-transitory computer-readable medium of claim 13, wherein the instructions further cause the terminal to be configured to:
sequentially record a changed simulated desktop parameter when the simulated desktop parameter changes; and
replace a current simulated desktop parameter with a last-recorded changed simulated desktop parameter when receiving a return operations signal.

15. The non-transitory computer-readable medium of claim 14, wherein the instructions further cause the terminal to be configured to:
determine a difference between the last-recorded changed simulated desktop parameter and a first simulated desktop parameter from when the simulated desktop was established;
invoke a system interface; and
apply the difference to the operating system.

16. A terminal comprising:
a memory;
a processor coupled to the memory and configured to:
acquire a system parameter of an operating system of the terminal that comprises multiple desktops, and wherein the system parameter indicates that the operating system of the terminal comprises the multiple desktops;
determine a first number of the multiple desktops of the operating system of the terminal; and
establish a simulated desktop on the terminal using preset configuration data according to the system parameter, wherein the simulated desktop simulates the multiple desktops of the operating system, wherein first content of a simulated desktop parameter of the simulated desktop is the same as second content of the system parameter, and wherein a second number of desktops of the simulated desktop is the same as the first number of the multiple desktops of the operating system.

17. The terminal of claim 16, wherein the system parameter comprises a setting parameter describing a setting of the operating system, a system desktop parameter describing the multiple desktops of the operating system, and an application parameter describing an installed application in the operating system.

18. The terminal of claim 17, wherein the processor is further configured to:
acquire a desktop background of the operating system, an application name, location coordinates, and a size of an occupied desktop of an application on the desktops, and current setting content of the operating system according to the setting parameter, the system desktop parameter, and the application parameter; and
further establish the simulation desktop using the preset configuration data according to the first number of the multiple desktops of the operating system, the desktop background, the application name, the location coordinates, the size, and the current setting content.

19. The terminal of claim 16, wherein the processor is further configured to:
monitor an operation type and an operation location of an operation performed on the simulated desktop, wherein the operation type comprises a tap or a slide;
determine the operation type and the operation location; and
present an interface or interaction information in response to determining the operation type and the operation location.

20. The terminal of claim 16, wherein the processor is further configured to instruct the memory to:
sequentially record a changed simulated desktop parameter when the simulated desktop parameter changes; and
replace a current simulated desktop parameter with a last-recorded changed simulated desktop parameter when receiving a return operation signal.

* * * * *